(12) United States Patent
Tahmasbi-Sarvestani

(10) Patent No.: US 10,836,390 B2
(45) Date of Patent: Nov. 17, 2020

(54) MONITORING DRIVER MOVEMENT

(71) Applicant: Honda Motor Co., Ltd., Tokyo (JP)

(72) Inventor: Amin Tahmasbi-Sarvestani, Farmington Hills, MI (US)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 16/133,062

(22) Filed: Sep. 17, 2018

(65) Prior Publication Data
US 2020/0086873 A1 Mar. 19, 2020

(51) Int. Cl.
*B60W 30/18* (2012.01)
*G08G 1/16* (2006.01)
*B60W 30/16* (2020.01)
*B60W 30/09* (2012.01)

(52) U.S. Cl.
CPC ...... *B60W 30/18109* (2013.01); *B60W 30/09* (2013.01); *B60W 30/16* (2013.01); *G08G 1/16* (2013.01); *B60W 2540/10* (2013.01); *B60W 2540/12* (2013.01); *B60W 2540/30* (2013.01); *B60W 2710/18* (2013.01)

(58) Field of Classification Search
CPC ...... B60W 30/00; B60W 30/09; B60W 30/16; B60W 30/18109; B60W 2540/10; B60W 2540/12; B60W 2540/30; B60W 2710/18; B60W 40/08; G08G 1/00; G08G 1/16; G07C 9/37; B60K 28/00; B60K 28/02; B60R 25/25
See application file for complete search history.

(56) References Cited

U.S. PATENT DOCUMENTS

| 5,835,008 | A | 11/1998 | Colemere, Jr. | |
|---|---|---|---|---|
| 9,245,179 | B2 | 1/2016 | Hong et al. | |
| 9,623,878 | B2 | 4/2017 | Tan et al. | |
| 10,446,047 | B1* | 10/2019 | Fields | G09B 19/167 |
| 10,599,155 | B1* | 3/2020 | Konrardy | B60W 10/04 |
| 2004/0016588 | A1* | 1/2004 | Vitale | B62D 1/04 |
| | | | | 180/322 |
| 2013/0245894 | A1 | 9/2013 | Huth et al. | |
| 2015/0203116 | A1* | 7/2015 | Fairgrieve | B60T 8/175 |
| | | | | 701/93 |

(Continued)

FOREIGN PATENT DOCUMENTS

| CN | 201821451 U | 5/2011 |
|---|---|---|
| DE | 102009042896 A1 | 2/2011 |
| DE | 102012023245 A1 | 6/2014 |

(Continued)

OTHER PUBLICATIONS

C. Tran et al., Modeling and Prediction of Driver Behavior by Foot Gesture Analysis, Computer Vision and Image Understanding, Mar. 2012, pp. 435-445, vol. 116 Issue 3, Elsevier Science Inc. New York, NY, USA.

(Continued)

*Primary Examiner* — Yonel Beaulieu
(74) *Attorney, Agent, or Firm* — American Honda Motor Co., Inc.; Aaron C. Fong

(57) ABSTRACT

The systems and methods provided herein are directed to an automated driver assistance system that monitors the area around the pedals of a vehicle and modifies the automated operation of the vehicle based on detected motion of the driver near the pedals.

18 Claims, 7 Drawing Sheets

(56) References Cited

U.S. PATENT DOCUMENTS

2017/0341658 A1* 11/2017 Fung .................. G07C 9/37

FOREIGN PATENT DOCUMENTS

EP          2314489 A1    4/2011
JP          2007118861 A  5/2007

OTHER PUBLICATIONS

E. Ohn-Bar et al., On surveillance for safety critical events: In-vehicle video networks for predictive driver assistance systems, Computer Vision and Image Understanding, May 2015, pp. 130-140, vol. 134, Elsevier Science Inc. New York, NY, USA.

* cited by examiner

| Follow Distance | 5 |
| Speed | 5 |
| Acceleration | 5 |
| Deceleration | 5 |
| Response Time | 5 |
402
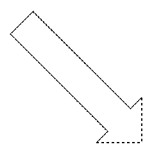
| Follow Distance | 6 |
| Speed | 5 |
| Acceleration | 5 |
| Deceleration | 5 |
| Response Time | 5 |
404
| Follow Distance | 6 |
| Speed | 5 |
| Acceleration | 5 |
| Deceleration | 3 |
| Response Time | 5 |
406
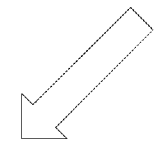
| Follow Distance | 8 |
| Speed | 5 |
| Acceleration | 6 |
| Deceleration | 2 |
| Response Time | 4 |
408
Fig. 4

500

| Driver Behavior | Duration | System Operations |
|---|---|---|
| Foot Near Brake | 2.2 s | Behind vehicle, accelerating |
| Foot Near Brake | 4.2 s | Behind vehicle, maintaining speed |
| Foot Near Accelerator | 2.0 s | Open lane, accelerating |
| Foot Near Accelerator | 18.4 s | Open lane, maintaining speed |
| Foot Near Brake | 4.0 s | Open lane, decelerating |
| Foot Near Accelerator | 0.8 s | Behind vehicle, decelerating |
| Foot Near Brake | 0.2 s | Open lane, maintaining speed |
| Foot Near Accelerator | 2.0 s | Open lane, accelerating |
| Foot Near Accelerator | 1.1 s | Open lane, accelerating |
| Foot Near Brake | 5.3 s | Behind vehicle, accelerating |

Fig. 5

| Identified pattern of driver behavior | Profile change |
|---|---|
| Foot near brake when behind a vehicle | Increase follow distance |
| Foot near accelerator when behind a vehicle | Decrease follow distance |
| Foot near brake when car accelerates | Decrease acceleration |
| Foot near gas when car accelerates | Increase acceleration |
| Foot near brake when maintaining speed | Decrease default speed |
| Foot near gas when maintaining speed | Increase default speed |
| Foot near brake when car decelerates | Increase deceleration |
| Foot near accelerator when car accelerates | Decrease deceleration |
| Movement latency greater than predicted | Increase response time |
| Movement latency less than predicted | Decrease response time |

Fig. 6

MONITORING DRIVER MOVEMENT

BACKGROUND AND BRIEF DESCRIPTION

Detection of driver behavior allows automobiles to customize operations to individual preferences. By keeping track of how the driver operates the vehicle, control systems in the vehicle can better anticipate the needs and status of the driver. For example, when a driver brakes or accelerates during an automated cruise control setting, the system can interpret these signals as indicators that the driver would have preferred the system to maintain a slower or faster speed, respectively, under those conditions.

Some existing vehicle control systems keep track of inputs received by the vehicle, such as steering, pushed buttons, and depressed foot pedals. However, user behavior also includes movements that are not interpreted as vehicle control inputs. Users modify their posture, change positions of their hands, focus their gaze on different points both within and outside the vehicle, and move their feet in and around the foot well. These user movements represent behaviors that, if known to the vehicle system, may allow for further customization of vehicle control to match the preferences of the driver.

The present disclosure describes methods and apparatus for tracking a driver's movement within the foot well of a vehicle. By identifying how the driver's feet are positioned relative to the pedals, even at times where the driver may not be actively operating the pedals, the system can more accurately estimate driver preferences and make appropriate changes to aspects of vehicle operation.

According to one embodiment, a vehicle control system includes a vehicle controller configured to automatically control one or more operations of a vehicle and a camera configured to send visual data from an area of the vehicle including the foot pedals to the vehicle controller. The vehicle controller is also configured to receive visual data from the camera; determine, from the received visual data, one or more movements of the vehicle driver during automatic control of the vehicle; based on the determined one or more movements of the vehicle driver, modify the data representing the vehicle driver's preferences; and subsequent to modifying the data representing the vehicle driver's preferences, automatically control one or more operations of the vehicle, wherein the automatic control is modified based at least in part on the modified data.

In one embodiment, automatically controlling one or more operations of the vehicle can include controlling vehicle acceleration. The controller can, while automatically controlling vehicle acceleration, receive sensor input representing a distance between the controlled vehicle and a nearby vehicle.

In some aspects of an exemplary embodiment, the controller can, based on the vehicle driver's preferences, maintain a distance between the controlled vehicle and the nearby vehicle.

In one embodiment, modifying the data representing the vehicle driver's preferences occurs while automatically controlling one or more operations of the vehicle.

In one embodiment, the controller can identify from a reference image first and second visual zones associated with first and second pedals; detect movement in each of the first and second visual zones; associate each of the movements with an automotive operation associated with the respective pedal. Movement associated with a brake pedal can represent a preference an increased a distance between the controlled vehicle and a nearby vehicle. Movement associated with an accelerator pedal can represent a preference for a decreased distance between the controlled vehicle and the nearby vehicle.

In one embodiment, the controller can detect a distance between the controlled vehicle and a nearby vehicle at the time that a first movement of the one or more movements is detected; and associate the detected distance with the first detected movement.

In one embodiment, one of the determined movement of the vehicle driver can be moving a foot away from a foot pedal.

According to one exemplary embodiment, a method of modifying automated vehicle operation includes any of the aforementioned steps.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 4 is an illustration of a driver profile changing over time in accordance with one aspect of the present disclosure;

FIG. 5 is an illustration of a driver behavior and system operations log in accordance with one aspect of the present disclosure;

FIG. 6 is an illustration of a behavioral change lookup table in accordance with one aspect of the present disclosure.

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to monitoring the pedal area of an automobile with a visual sensor in order to detect movements of the driver's feet. The movements are used to determine the driver's preferences and/or status, which is then used to automatically modify adaptive aspects of the automobile's operation.

Figure 1:
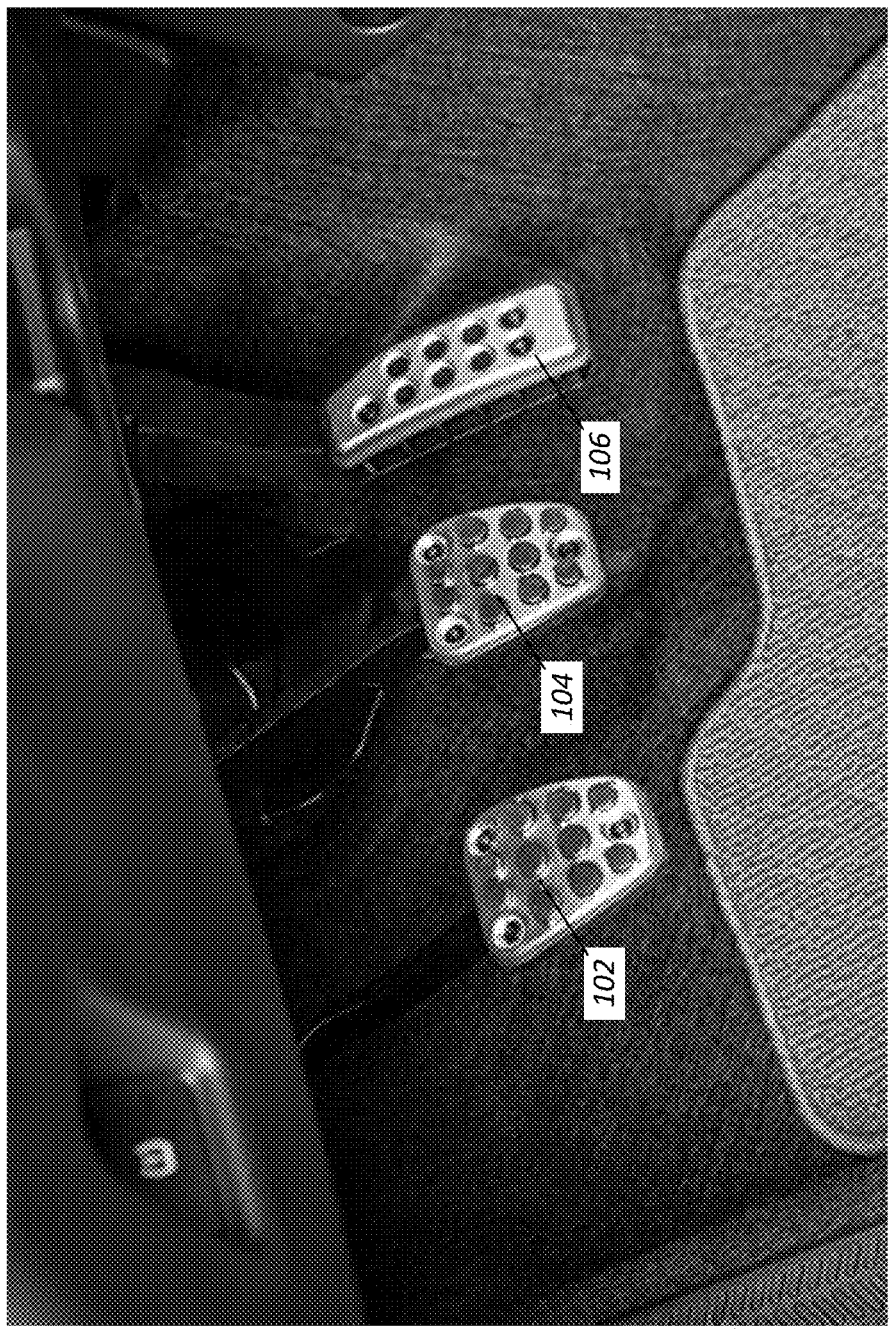
FIG. 1 shows an exemplary image in accordance with one aspect of the present disclosure.

FIG. 1 illustrates an image 100 of the pedal area, also known as the foot well, of an automobile. The camera is positioned so that it can observe a user's foot moving within the area in front of and above the clutch 102, the brake pedal 104 and the accelerator 106. As further described herein, the camera may be oriented so as to place each of the pedals 102, 104, and 106 in substantially separate fields of view so that it is possible to discern from the camera image whether a driver's foot is near one pedal or another.

Figure 2:
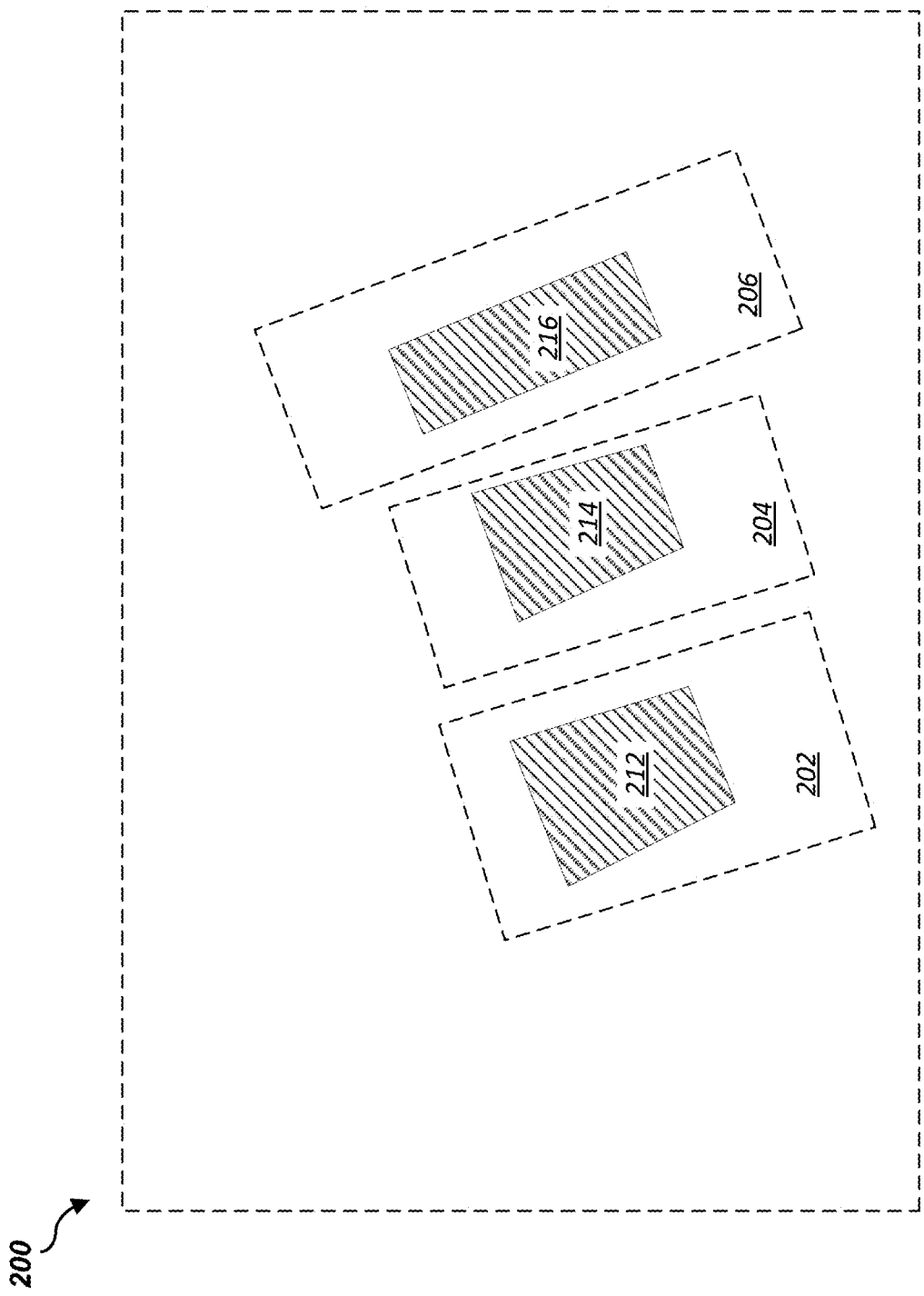
FIG. 2 is an illustration of a computer vision delineation of an image in accordance with one aspect of the present disclosure.

FIG. 2 illustrates how a visual field 200 may be delineated by means of a computer vision system in accordance with embodiments of the disclosure. Any appropriate image processing methods known in the art may be used to detect an object's motion within a zone of the visual field. For example, the system may periodically update a reference image of an empty pedal area, which may be a single image or may be a reference range generated from a plurality of images. While the system is monitoring the same visual field, a differential can be calculated between each received image and the reference image. Areas of the visual field that significantly differ from the reference images are identified as having objects positioned therein.

The visual field 200 is delineated into a first zone 202, a second zone 204, and a third zone 206 each associated with one of the pedals which match to the clutch 212, brake pedal 214, and accelerator 216 as seen by the visual system. In one implementation, motion within any of the delineated zones 202, 204, or 206 is treated as being proximate to its associated pedal 212, 214, or 216 in identifying driver behavior for customization of vehicle operation.

In some implementations, a visual system may determine the zones associated by each pedal through a learning procedure that correlates previous images with known user behavior. For example, when a pedal is pressed, the system may thereafter identify visual images surrounding the activation event with that particular pedal. The zones where movement is detected during the identified visual images may then subsequently be included in the visual detection zone for that pedal. In some implementations, where the camera angle is fixed upon manufacture such as with an integrated camera system, the zones associated with each pedal may be affixed to the camera angle upon initial configuration of the automated system. In some implementations, the size and shape of the zones may be fixed by initial configuration, but an offset may be matched to detection by the system of the pedals in the image. For example, where a shift of the camera may cause the pedal positions to shift down or to the right, the zones may be shifted within the delineation of the visual field by the same amount.

Figure 3:
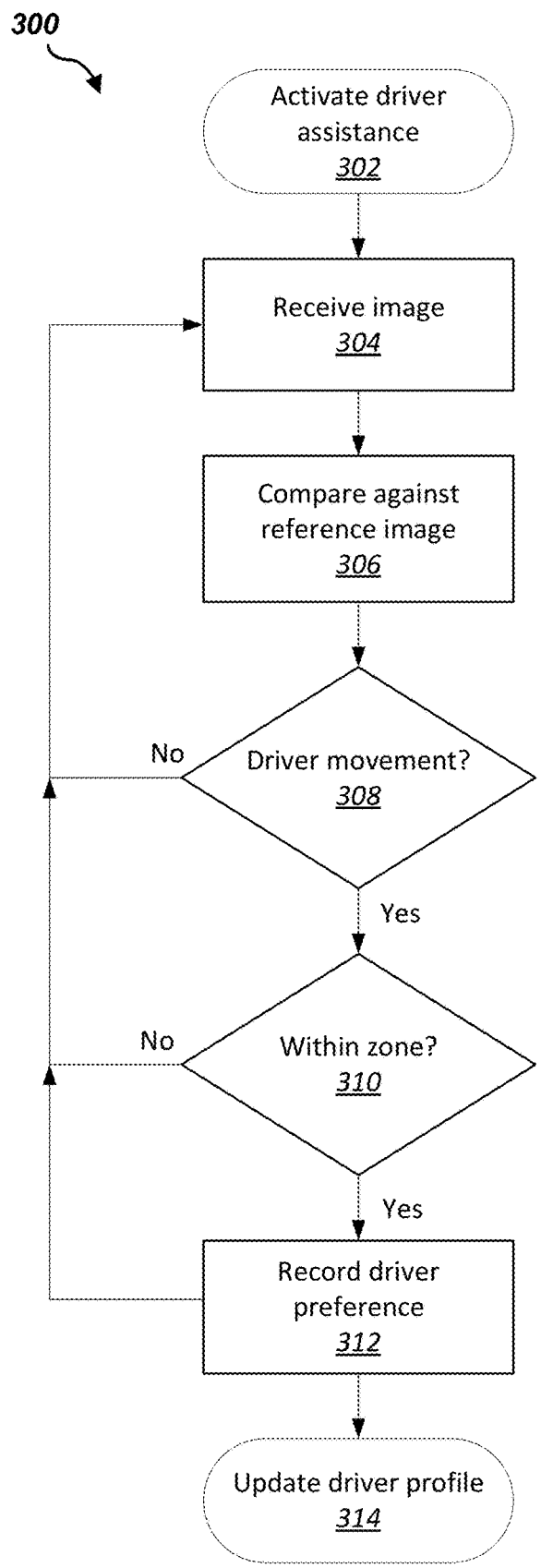
FIG. 3 is a flow diagram illustrating an exemplary method for monitoring driver motion and customizing driver assistance features in accordance with one aspect of the present disclosure.

FIG. 3 is a flowchart illustrating an exemplary method 300 for operating a system that monitors driver movement. In some implementations, the method takes place during use of an automated driver assistance feature of the vehicle controller (step 302). One of ordinary skill in the art will recognize a variety of automated driver assistance features by which one or more operations of the vehicle may be placed partially or entirely under the automated operation of a vehicle control system. For example, an adaptive cruise control (or ACC) feature applies acceleration and deceleration operations in order to maintain a set speed and/or a set distance from another vehicle. As another example, a lane-keeping feature applies steering operations in order to keep the vehicle within a particular lane or area on the road.

While the driver assistance feature is active, a control loop represented by steps 304 to 312 repeats in order to monitor and adjust the automated operations of the vehicle. The system receives an image of the pedal area (step 304). In some implementations, images may be received continually as a camera may be capturing and sensing images in real-time at a rate consistent with a video image. In other implementations, a multi-tiered control structure may be used whereby images are only passed along to a decision-making system if an initial operation performed at some lower level detects driver movement (as noted below with respect to steps 306 and 308). One of ordinary skill in the art will recognize a variety of computer vision techniques that can be used to allow for efficient processing of the images in real-time.

The system compares the received image against a reference image as known in the art (step 306). In some implementations, the received image or the reference image may be renormalized to allow for changes in lighting that may cause differences between the two images that are not due to moving objects within the field of view. Other techniques can be used to filter false positives out from the comparison step and the subsequent determination of driver movement (step 308), such as requiring a minimum number of frames representing movement within a window of time.

If it is determined that sufficient differences exist to represent movement, the location of that movement may then be tested against delineated zones within the field of view (step 310). In some implementations, a center of mass for the differential between the reference image and the received image may be used to locate the movement within the field of view and compare it against the delineated zones. Movement spread over a large area of the field of view may, in different implementations, be registered as no movement, as movement within one zone, or as movement within multiple zones. In some implementations, the particular algorithm used to register movement within one or more zones may depend on settings within the control system that may be automatically or manually adjusted. The particular algorithm may also depend on existing driver preferences and the current operational state of the vehicle.

If a movement is found to be within a particular zone, then the movement may be recorded as a driver preference (step 312). As one example, when an adaptive cruise control feature maintains a set distance from a nearby vehicle, the system may detect a foot movement toward the brake pedal as indicating a preference for a longer distance between vehicles. A movement toward the brake pedal could also be interpreted, for example, as a preference for a more rapid automated deceleration in response to the nearby vehicle slowing down or entering the controlled vehicle's lane. A foot movement toward the accelerator could be interpreted as indicating a preference for a shorter distance between vehicles, or for a more responsive and rapid automated acceleration in response to the nearby vehicle speeding up or moving away.

In some implementations, driver movements may be aggregated over multiple detection events before they are determined to represent driver preferences. For example, a system may accumulate all of the driver movements over a period of several minutes before making an assessment of the driver's preferences. If, as an example, a foot near the brake pedal was detected 15 times but a foot near the accelerator was only counted 3 times during the established window, then the driver's net preference could be identified as preferring a longer follow distance.

In some implementations, a preference may also be registered against an operation associated with a particular pedal if a foot moves away from that pedal. For example, if a driver's foot begins resting on or near the accelerator and then is detected to withdraw from the accelerator, this movement may be considered to be a preference to not accelerate or to decelerate even though it occurs in the zone associated with the accelerator. In this way, the particulars of the driver's movement may be taken into account as well.

In some implementations, a driver profile, used as a basis for controlling the driver assistance, may be updated at periodic intervals (314). The driver profile may only be updated when it is compared against recently recorded driver preferences and found to contain differences above a threshold. In some implementations, a driver profile may also be updated any time a driver assistance feature is newly activated or deactivated to assure that the most recent recorded preferences are included. In different implementations, the automated driver assistance features may or may not fully modify operations from updated profiles when they are updated during an ongoing activation of a feature; instead, some settings of the feature may be set upon initialization and not be modified until the feature (or even the system) is initialized again.

FIG. 4 illustrates a particular implementation of a driver profile 402-408, which may include a variety of settings each associated with a range of values. The exemplary profile 402 includes five values, each of which is allocated a score between 1 and 10. Default scores may be provided to the profile 402 when first initialized; as shown, each score is set to 5. Changes to the profile are shown in the subsequent elements 404, 406, and 408 sequentially, resulting in a final profile 408 in which the scores vary significantly from the initial profile 402. In some implementations, any time the adaptive system is initialized without the driver having a known profile, the system uses a default profile with preselected scores in order to determine the appropriate values for automatic functions that include profile settings.

As illustrated, the profiles 402-408 include a "Follow Distance" setting that reflects the distance that the system will leave between the vehicle and a sensed vehicle in front of it. The score may be only one factor that the vehicle uses for determining a follow distance; other factors may include driving conditions and a calculated stop distance. As a non-limiting example, an equation for stopping distance is shown as Equation 1:

$$x=(1.25\ \text{sec})*v+(10\ \text{ft})*s \qquad (1)$$

The follow distance x is calculated by adding between 10 and 100 feet, according to the profile score s, to a distance calculated by multiplying the velocity of the car v (in units of feet per second) to a selected time window, in this case 1.25 seconds. In some implementations, the equation used may vary according to sensed driving conditions, and may also vary according to the range of speeds at which the car is operating. For example, the equation for follow speed under city driving conditions and/or low speeds may differ from the equation used under interstate highway driving conditions and/or high speeds.

As illustrated, the profiles 402-408 include a "Speed" setting that reflects a default speed at which the system sets the adaptive cruise control. The system may calculate a default speed based on both the profile score and any number of other factors, such as the road speed limit, the sensed speeds of nearby cars, road conditions, and the like. As a non-limiting example, an equation for default speed is shown as Equation 2:

$$x'=\min[L,(L+n)/2-(2\ \text{mph})*(10-s)] \qquad (2)$$

The default speed x' is calculated as an average of the posted speed limit L and the average sensed nearby vehicle speed n, reduced by between 2 and 20 mph according to the profile score. A minimum function is also included, assuring that the vehicle does not exceed the posted limit. Again, various exterior constraints and conditions may result in the system using different equations in some implementations.

As illustrated, the profiles 402-408 include "Acceleration" and "Deceleration" settings that reflect the magnitude of acceleration and braking, respectively, that the system takes when making automatic adjustments to the vehicle's speed. In some implementations, the scores may reflect a preference for either rapid or gradual changes in speed. Drivers may have different preferences with respect to acceleration than with respect to braking; for example, the updated profile 408 shows a low Deceleration score of 2 and a moderate Acceleration score of 6, implying a driver's preference for more gradual braking than acceleration. In some implementations, the profile scores may only be used in environments where speed changes within the calculated parameters are considered safe. For example, where collision avoidance requires rapid braking or where acceleration is necessary to match safe traffic speeds, the profile settings may be ignored or the calculations modified to accommodate these conditions.

As illustrated, the profiles 402-408 include a "Response Time" setting that reflects the driver's predicted behavioral changes to changing environmental conditions. The system may use this setting to more accurately correlate the driver's movement with system operations, such as changes in automated cruise control or response to dashboard prompts. As a non-limiting example, an equation for response time is shown as Equation 3:

$$t=(0.7\ \text{seconds})+(0.3\ \text{seconds})*s \qquad (3)$$

The response time t using Equation 3 would vary between 1.0 seconds and 3.7 seconds depending on the profile score s. In other implementations, more than one response time may be predicted based on the driver's varied responses to different stimuli. Using the updated profile 408, the driver would have a calculated response time of 1.9 seconds. In some implementations, when matching the driver's behavior to system operations as further described below, the system may match the sensed movements at a given time to the system operations and 1.9 seconds before that time, in order to take the latency of the driver's reactions into account.

As illustrated in FIG. 4, multiple updates may be made to the driver profile based on sensed behaviors. For example, after noting that the driver tends place their foot near the brake when the vehicle is following another vehicle, the Follow Distance is increased from 5 to 6 (profile 404). After noting foot movements near the accelerator when the automated system decelerates the vehicle, the Deceleration is decreased to 3 (profile 406). After various further sensed behaviors, an updated profile 408 emerges with several scores different from their default values.

In some implementations, a vehicle system may maintain a behavior log 500 as illustrated in FIG. 5. The exemplary log 500 records when the driver's foot is near the brake or the accelerator, how long it stays there, and what system operation best matches that action. Note that the system may take into account either known or presumed latency for driver reaction, as further described above with respect to a driver profile's Reaction Time score. Other modifications to the correlation may also be appropriate in different implementations.

As shown in the behavior log 500, the driver's foot was logged as being near the brake for 2.2 seconds while the system detected a vehicle in front of it and was accelerating to match its speed. There is then an interval of 4.2 seconds where the system is maintaining speed while behind a detected vehicle, and the driver's foot is near the brake. At a later time, while the vehicle was accelerating in an open lane, and then later when the vehicle maintained speed in the open lane, the driver's foot was near the accelerator for 2.0 and 18.4 seconds respectively. A log entry then showed the driver's foot near the brake for 4.0 seconds while the vehicle decelerated in an open lane (while the system itself may or may not be equipped to recognize this, one of ordinary skill in the art will understand that, for example, a system attempting to maintain a target speed may decelerate during downhill travel or to safely navigate a road feature such as a turn).

The next log entry shows the driver's foot near the brake for 0.2 seconds while the vehicle is maintaining speed in an open lane. In some implementations, an entry with a time interval below a certain threshold, such as this entry, may be disregarded. Furthermore, this entry may be compared to the earlier entry that detected the driver's foot near the accelerator for 18.4 seconds while the vehicle maintained speed in an open lane, which is contradictory behavior. Due to the relative magnitude of the time intervals in these entries, the system may choose to make modifications as herein described in accordance with the 18.4 second entry rather than the 0.2 second entry. Adaptive interpretation by the system via machine learning may lead to other responses to this entry.

The behavior log 500 then includes two entries where the driver's foot is near the accelerator while the system is accelerating in an open lane, for 2.0 and then 1.1 seconds. The final entry, consistent with an earlier entry, logs the detection of the driver's foot near the brake for 5.3 seconds while the system trails a detected vehicle and accelerates to match speed with that vehicle.

The system may, in some implementations, look for patterns in the log 500 by finding operations are responded to by drivers in the same way repeatedly, and/or over a long period of time. In the illustrated log 500, the driver's foot stayed on the brake for multiple seconds both times that the vehicle was accelerating while behind another vehicle. The driver also kept a foot near the accelerator for more than eighteen seconds on one occasion when the system was maintaining the car's speed in an open lane. Either or both of these noticed behaviors could lead to profile changes as described herein.

One of ordinary skill will recognize a variety of methods by which an automated system could respond to sensed behaviors by changing user profiles. A lookup table, such as the illustrated table 600 of FIG. 6, is one such example. Here, the system can respond to an identified pattern of driver behavior by making a particular profile change. The intensity and consistency of the behavior may each determine the magnitude of the change, or how often the system changes the profile setting in the same direction.

As shown in the table 600, the system may modify the set follow distance based on the user's pattern of behavior when following another vehicle. When a pattern of the user's foot being near the brake is shown, the follow distance is increased; when the pattern is for the user's foot to stay near the accelerator, the follow distance is decreased. In practice, the system may detect user behavior that is mixed, with some detection at the accelerator and some near the decelerator at different times. In some implementations, the system may only determine that a pattern of behavior exists when one of these two behaviors is detected significantly more often than the other. For example, if the total duration detected near one pedal exceeds the other by a factor of 3:1 or greater, the system may determine that this represents a pattern of behavior. When the ratio of time spent on each pedal is less disparate than some established threshold, the system may not determine a pattern of behavior or change the profile.

Also shown in table 600, acceleration or deceleration magnitude in a driver's profile may be modified based on a detected pattern of behavior when the car is automatically accelerating or decelerating, respectively. Where the system determines a pattern that the driver's foot is near the accelerator when the vehicle is accelerating, the acceleration value of the profile increases. Where the system determines a pattern that the driver's foot is near the brake when the vehicle is accelerating, the acceleration value of the profile decreases. Where the system determines a pattern that the driver's foot is near the accelerator when the vehicle is decelerating, the deceleration value of the profile decreases. Where the system determines a pattern that the driver's foot is near the brake when the vehicle is decelerating, the deceleration value of the profile increases. In some implementations, a pattern may again only be detected when one foot behavior is clearly more prevalent than the other.

The table 600 also illustrates that the default speed value of the profile may be modified based on the user's behavior when the system is maintaining speed, such as when the vehicle has attained the current default speed in an open lane. A pattern of the driver's foot near the brake pedal may cause the default speed to be decreased; a pattern of the driver's foot near the accelerator may cause the default speed to be increased. No change may occur when no pattern is detected.

In some implementations, the system may also be set up to identify the driver's response time based on the user's reactions to alerts and to changes in the driving situation during the utilization of an automated driving feature. A rolling average of the user's detected latency may be maintained, and the profile response time may be modified when the rolling average is consistently different than predicted over a significant interval of time.

While the table 600 provides a set of parameters that a system might use to modify profiles based on driver behaviors, other systems may use a more flexible set of parameters based on both preset and adaptive data sets. In some implementations, any of a variety of adaptive machine learning processes known in the art may be applied by a control system in order to group detected user behaviors, identify patterns, and revise system parameters based on implied user preferences.

Figure 7:
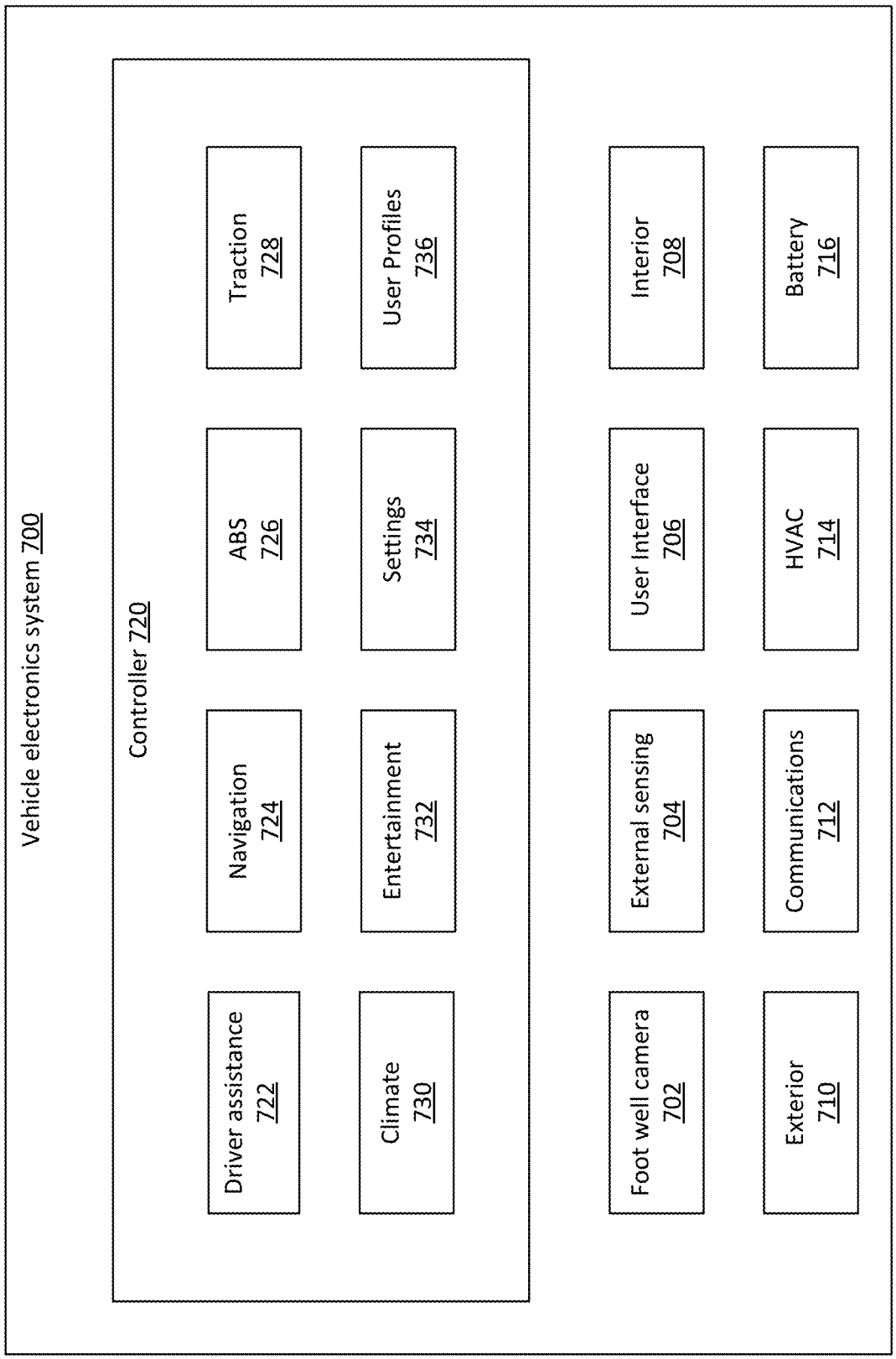
FIG. 7 is a schematic of a vehicle electronics system in accordance with one aspect of the present disclosure.

A schematic of the components of an exemplary vehicle electronics system 700 embodying aspects of the present disclosure is illustrated in FIG. 7. The electronics system 700 may include a foot well camera 702. The camera 702 may, in some implementations, be integrated with the vehicle, may be powered by the vehicle's electrical system, and may be in electrical communication with the vehicle's control system. In some implementations, the camera 702 may be an after-market addition to the automobile and may have different levels of integration with vehicle systems according to varying installation procedures known in the art. As described herein, the camera 702 is positioned for a field of view appropriate for differentiating movement associated with different pedals.

A vehicle electronics system may include many hundreds of different components, subsystems, and connected systems as known in the art. The exemplary schematic of FIG. 7 includes some illustrative components but is by no means limited or even representative of such a system 700. External sensing apparatus 704 may provide various data for use by other components of the system 704. The external sensing apparatus 704 may include radar, lidar, sonar, visual sensors including cameras, vibration sensors, and the like, which in some implementations may be used by automated driver assistance features. A user interface 706, such as controls and a display, may allow for the selection of settings and execution of commands by a user, including a vehicle driver or passenger. In some implementations, the user interface 706 may allow a user to modify settings associated with driver assistance features and even modify one or more user profiles. The electronics system may also include interior electronics 708 such as seat adjustments and lighting; exterior electronics 710, such as mirror adjustments and lighting; communications apparatus 712, such as systems to transmit and receive data outside the vehicle; a HVAC system 714 for temperature and ventilation control; a battery 716 to power components within the system 700 that may in turn be powered by internal or external power sources; and the like.

The vehicle electronics system includes a controller 720 which is in electronic communication with a variety of systems both to receive information and to send commands. The controller 720 may be a computer system including one or more processors, one or more systems for electrical communication with other components, and one or more non-transitory computer-readable storage media. As illustrated, the controller 720 may include several different modules 722-736 which represent data and/or computer-readable instructions in order to execute features and operations associated with the controller 720. While described as components of the controller 720, one of ordinary skill will recognize that modules may be executed as part of a variety of computing systems or by coordination of multiple systems as known in the art.

The controller 720 may contain one or more driver assistance modules 722 for carrying out driver assistance features that control, in whole or in part, vehicle operations. In some implementations, a driver assistance module 722 may read info from settings 734 and one or more user profiles 736 stored in or available to the controller 720. A driver assistance module may, as described herein, receive and interpret images taken by the foot well camera 702 that modify user preferences and may then be used to modify a user profile 736. The driver assistance modules 722 may receive data from external sensing apparatus 704, instructions from the driver through a user interface 706, and data through communications apparatus 712.

One or more driver assistance modules 722, in some implementations, may also request and receive data from navigation modules 726 that may include, for example, GPS and other positioning data as well as data associated with a desired destination. Driver assistance modules 722 may request and receive data from other modules that may automatically control vehicle operations such as an anti-lock braking module 726, traction management module 728, or collision avoidance system. Other modules, such as climate or entertainment, may have effects on the driver's movements that in some implementations may be taken into effect when interpreting driver movement as herein disclosed.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C #. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for a vehicle having foot pedals and a vehicle driver, comprising:
   automatically controlling one or more operations of the vehicle, wherein the automatic control is based at least in part on data representing the vehicle driver's preferences;
   receiving reference image from an area of the vehicle including the foot pedals during automatic control of the vehicle;
   identifying from the reference image a first visual zone associated with a first pedal and a second visual zone representing a second pedal:
   detecting movement in the first visual zone;
   associating movement in the first visual zone with an automotive operation associated with the first pedal;
   detecting movement in the second visual zone: and
   associating movement in the second visual zone with an automotive operation associated with the first pedal;
   based on the movements of the vehicle driver, modifying the data representing the vehicle driver's preferences; and
   subsequent to modifying the data representing the vehicle driver's preferences, automatically controlling one or more operations of the vehicle, wherein the automatic control is, modified based at least in part on the modified data.

2. The computer-implemented method for the vehicle having foot pedals and the vehicle driver of claim 1, wherein automatically controlling one or more operations of the vehicle comprises controlling vehicle acceleration.

3. The computer-implemented method for the vehicle having foot pedals and the vehicle driver of claim 2, further comprising, while automatically controlling vehicle acceleration, receiving sensor input representing a distance between the controlled vehicle and a nearby vehicle.

4. The computer-implemented method for the vehicle having foot pedals and the vehicle driver of claim 3, further comprising, based on the vehicle driver's preferences, maintaining a distance between the controlled vehicle and the nearby vehicle.

5. The computer-implemented method for the vehicle having foot pedals and the vehicle driver of claim 1, wherein modifying the data representing the vehicle driver's preferences occurs while automatically controlling one or more operations of the vehicle.

6. The computer-implemented method for the vehicle having foot pedals and the vehicle driver of claim 1, wherein movement associated with a brake pedal is determined to represent a preference for an increased a distance between the controlled vehicle and a nearby vehicle.

7. The computer-implemented method for the vehicle having foot pedals and the vehicle driver of claim 1, wherein movement associated with an accelerator pedal is determined to represent a preference for a decreased distance between the controlled vehicle and a nearby vehicle.

8. The computer-implemented method for the vehicle having foot pedals and the vehicle driver of claim I, further comprising:
   detecting a distance between the controlled vehicle and a nearby vehicle at the time that a first movement of the one or more movements is detected; and
   associating the detected distance with the first detected movement.

9. The computer-implemented method for the vehicle having foot pedals and the vehicle driver of claim 1, wherein one of the determined movements of the vehicle driver is moving a foot away from a foot pedal.

10. A control system for a vehicle having foot pedals and a vehicle driver, comprising:
    a vehicle controller configured to automatically control one or more operations of the vehicle; and
    a camera configured to send reference image from an area of the vehicle including the foot pedals to the vehicle controller;
    wherein the vehicle controller is further configured to:
       receive the reference image from the camera during automatic control of the vehicle;
       identify from the reference image a first visual zone associated with a first pedal and a second visual zone representing a second pedal:
       detect movement in the first visual zone:
       associate movement in the first visual zone with an automotive operation associated with the first pedal;
       detect movement in the second visual zone; and
       associate movement in the second visual zone with an automotive operation associated with the first pedal;
       based on the movements of the vehicle driver, modify the data representing the vehicle driver's preferences; and
       subsequent to modifying the data representing the vehicle driver's preferences, automatically control one or more operations of the vehicle, Wherein the automatic control is modified based at least in part on the modified data.

11. The control system for the vehicle of claim 10, wherein automatically controlling one or more operations of the vehicle comprises controlling vehicle acceleration.

12. The control system for the vehicle of claim 11, wherein the vehicle controller is further configured to, while automatically controlling vehicle acceleration, receive sensor input representing a distance between the controlled vehicle and a nearby vehicle.

13. The control system for the vehicle of claim 12, wherein the vehicle controller is further configured to, based on the vehicle driver's preferences, maintain a distance between the controlled vehicle and the nearby vehicle.

14. The control system for the vehicle of claim 10, wherein modifying the data representing the vehicle driver's preferences occurs while automatically controlling one or more operations of the vehicle.

15. The control system for the vehicle of claim 10, wherein movement associated with a brake pedal is determined to represent a preference for an increased distance between the controlled vehicle and a nearby vehicle.

16. The control system for the vehicle of claim 10, wherein movement associated with an accelerator pedal is determined to represent a preference for a decreased distance between the controlled vehicle and a nearby vehicle.

17. The control system for the vehicle of claim 10, wherein the vehicle controller is further configured to:
    detect a distance between the controlled vehicle and a nearby vehicle at the time that a first movement of the one or more movements is detected; and
    associate the detected distance with the first detected movement.

18. The control system for the vehicle of claim 10, wherein one of the determined movements of the vehicle driver is moving a foot away from a foot pedal.

\* \* \* \* \*